Figure 2:
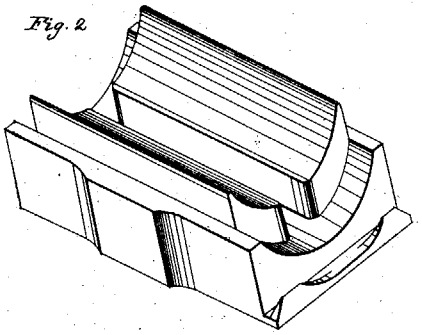
Figure 4:
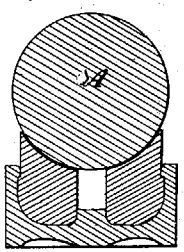
Figure 3:
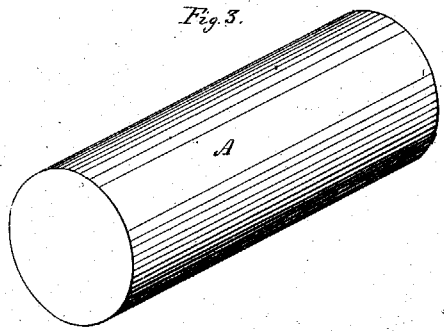
Figure 1:
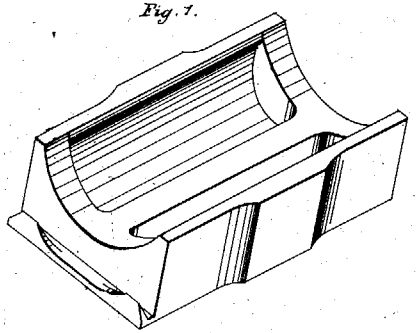
Figure 5:
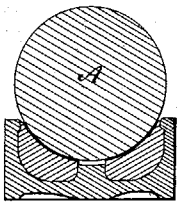

P. S. Derlan,

Journal Box.

Nº 1,209. Reissued July 9, 1861.

UNITED STATES PATENT OFFICE.

PATRICK S. DEVLAN, OF ELIZABETHPORT, NEW JERSEY.

IMPROVEMENT IN JOURNAL-BOXES.

Specification forming part of Letters Patent No. 30,128, dated September 25, 1860; Reissue No. 1,209, dated July 9, 1861.

DIVISION B.

*To all whom it may concern:*

Be it known that I, PATRICK S. DEVLAN, of Elizabethport, in the county of Union and State of New Jersey, have invented a new and useful Improvement in Journal-Boxes, of which the following is a specification.

My present invention relates to a novel composition for the bearing-surfaces of all kinds of journal-boxes, and has for its object the employment of paper-pulp, or any vegetable fibrous matter pulped, in combination with gypsum or soapstone, or other fine earthy matter, to form the bearing-surface of journal-boxes.

It has been customary, previous to my invention, to make the bearing-surfaces of all kinds of journal-boxes of stone, metal, or alloy by casting it in molds. I have discovered that any kind of vegetable fibrous matter reduced to a pulpy state and mixed with (about one-third its bulk of) plaster-of-paris or any other fine earthy matter, and then dried and compressed, will constitute a composition which is admirably adapted to form the bearing-surface of all kinds of journal-boxes; and my present invention consists in a new composition for journal-box bearing-surfaces, formed by mixing in a moist state any fibrous vegetable pulp with (about one-third of its bulk of) plaster-of-paris, or other fine earthy matter, and compressing the whole into a dry, solid condition, as hereinafter described.

To enable those skilled in the art to make and use my present invention, I will describe the mode in which I have practiced the same.

I take paper-pulp, or old paper reduced to pulp, or any fibrous pulp, and extracting sufficient moisture from it to have it in only a plastic state I mix it with about one-third its bulk of plaster-of-paris, or any other fine earthy substance. While in a plastic state, I fill this composition into the boxes of which it is to constitute the bearing-surface, leaving a surplus or overcharge, and when the composition has become dry I submit it (in the box) to a severe pressure, and compress its particles into a very solid condition.

In another application filed simultaneously with this, for making the bearing-surfaces of journal-boxes of paper or other vegetable fibrous pulp, this method of forming a plastic material into the solid bearings of the box is fully illustrated, and since the mode of forming the composition into the box forms no part of this invention, I need not more particularly describe it here. In lieu of compressing the composition into the box itself, it may be compressed into solid blocks and afterward turned out and fitted into any and all kinds of boxes for various kinds of journals.

In preparing my new composition for journal-boxes I have sometimes added in a very small portion of gum-shellac, or other gum, which I have found to be useful in giving to the composition a capacity to adhere to the box or shell in which it is pressed; but I do not mean to limit my invention to the combining of gum with the other ingredients before mentioned.

It will be understood that I contemplate the employment of any vegetable fibrous matter to (reduce to pulp and) mix with plaster; and it will be further understood that I do not wish to limit myself to the use of plaster-of-paris, as any fine earthy matter which is free from grit and non-conductive of heat will serve my purposes equally as well as the plaster, for, since the element of combustability has not to be considered in the selection of the earthy element of my new composition, it is evident that any earthy matter possessing otherwise substantially the same properties for the purpose in view may be substituted for the plaster-of-paris without departing from the spirit of my invention which rests in the idea of combining any vegetable fibrous matter in a plastic state with plaster-of-paris or other fine earthy substance, and compressing the mass into a solid condition substantially as I have explained.

I have mentioned the proportions of the ingredients as being about one part of plaster to two parts of fibrous pulp; but it will be understood that the exact proportions are not at all important, and can be varied without materially affecting the nature and properties of the composition produced, so far as its employment for the purpose stated is concerned.

The advantages of my new composition for all kinds of bearings are as follows: It does not heat up by friction as other materials or composition; it is exceedingly more durable than any kind of bearing-surface heretofore employed, and its cost is almost nominal.

Having explained the nature of my invention and described its practical application, so that one skilled in the art can make and use it, what I claim as new, and desire to secure by Letters Patent, is—

Forming the bearing-surfaces of journal-boxes of a composition of vegetable fibrous matter and fine earthy substance, substantially as hereinbefore described.

In testimony whereof I have hereunto set my hand this 27th day of March, 1861.

P. S. DEVLAN.

Witnesses:
WM. C. MCINTIRE,
PETER DEVINE.